Figure 1:
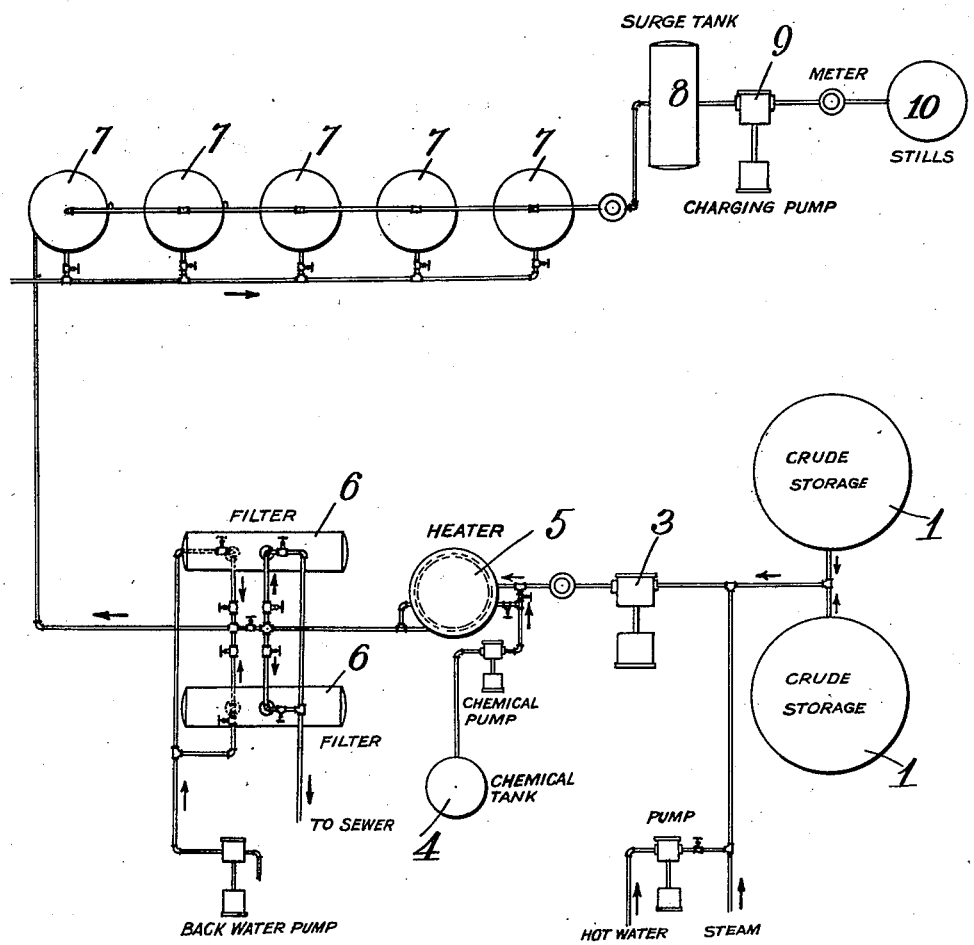

Fig. 2.
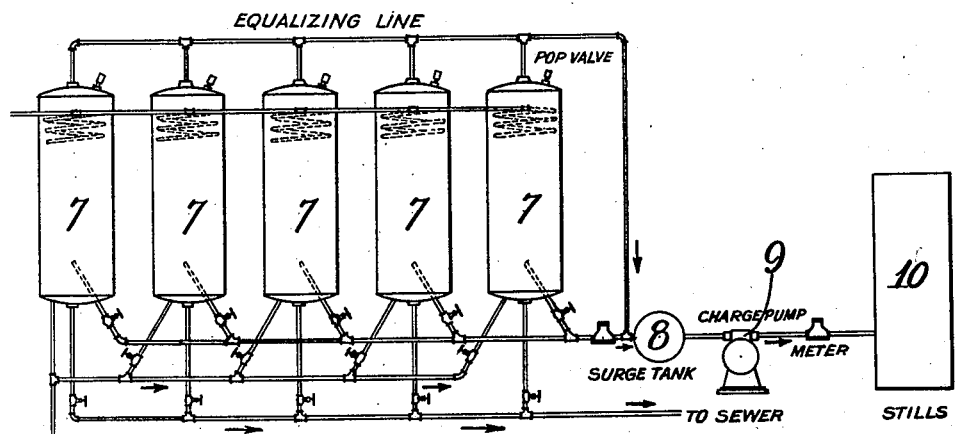
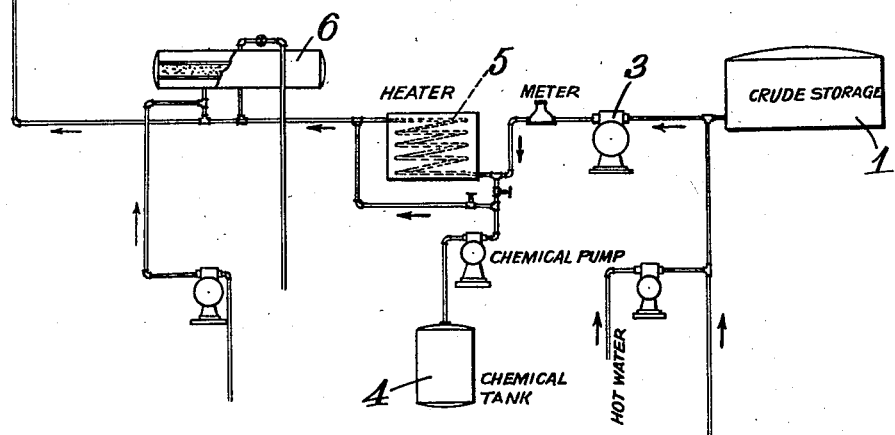
INVENTORS
LLOYD L. DAVIS
BY ALFRED HENRIKSEN
JOHN J. ALLINSON
ATTORNEY Patented Mar. 14, 1933

1,901,228

UNITED STATES PATENT OFFICE

LLOYD L. DAVIS, ALFRED HENRIKSEN, AND JOHN J. ALLINSON, OF PONCA CITY, OKLAHOMA, ASSIGNORS TO CONTINENTAL OIL COMPANY, OF PONCA CITY, OKLAHOMA, A CORPORATION OF DELAWARE

PROCESS FOR THE REMOVAL OF IMPURITIES FROM CRUDE PETROLEUM

Application filed July 5, 1928. Serial No. 290,409.

The petroleum oils obtained in many localities are not produced in a pure state, but are mixed with water or natural brines which occur in strata adjacent the oil-bearing stratum which become mixed with and disseminated throughout the oil as the latter flows or is pumped from the well. These natural brines contain chlorides, sulphates and carbonates of sodium, calcium and magnesium and other salts of similar nature and on being dispersed throughout the oil form more or less permanent emulsion from which they do not settle at ordinary temperatures. Some petroleum oils have considerable quantities of crystals of salts dispersed throughout the oil.

In petroleum oils which contain high percentage of wax and asphalt, the crystals of salts and the finely divided droplets of water will be surrounded by a film of asphalt, wax or similar material which will not permit the settling out at ordinary temperature and which require a special process and apparatus to remove. The heating of mixtures of oil, brine and dispersed crystals of salts of this type involve many difficulties if attempted in the oil stills during the distillation of the oil. In heating the oil above the boiling point of water during the distillation, the water tends to evaporate suddenly, causing foaming of the oil which interferes with the operation of the still, and causing the salts to crystallize out, forming a hard scale on the still bottoms or in the pipe still tubes. The result of this deposit on the still bottoms or tubes is that it increases the resistance to the transfer of heat to the oil, causing over heating of tubes and still bottoms, hot spots and numerous shut-downs. The removal of the salts before the distilling operation minimized the corrosion on the distilling equipment due to the removal of the magnesium and calcium chlorides which hydrolize, forming hydrogen chloride, which at the points of condensation is very corrosive.

The primary object of this invention is to provide a process and apparatus for the efficient removal of salts from petroleum oils, before distillation is attempted. Another object of the invention is to provide a process and apparatus in which the separation of salts is continuously effected, thus obviating the numerous shut-downs of distilling equipment due to the deposition of salt on still bottoms and in pipe still tubes, causing hot spots, burning out of tubes, etc. We have found the invention possesses other advantageous features, some of which, with the foregoing will be set forth at length in the following description, where we shall outline in full that form of the apparatus which we have selected for illustration in the drawings accompanying and forming part of the present specification. In the drawings, we have shown one specific form of the apparatus of our invention, but it is to be understood that we do not limit ourselves to such form, since the apparatus may be embodied in a plurality of forms without departing from the invention as expressed in the succeeding claims. We also do not limit ourselves to the condition of temperature, pressure and percent of water as these should be predetermined for each specific petroleum oil. By using the term salts, we mean any mineral compounds found to be associated with petroleum oil.

We have found that by heating mixtures of petroleum oil and salt and/or brine in the presence of added water and under conditions which preclude vaporization that the films of asphalt or wax or similar materials surrounding the brine and/or salt crystals are dissolved or broken down, thereby exposing the brine particles and/or salt crystals to the dissolving action of the added water. We have further found that the emulsion of brine and petroleum oils so formed can be broken down and the brine and oil rendered easily separable by passing the same under certain temperature conditions thru a bed of granular material or by adding thereto a suitable chemical demulsifying agent. In some oils, this may be accomplished at temperatures below the normal boiling point of the oil, water and brine mixture, and with other oils it is necessary to go to higher temperatures than the normal boiling point of the mixture, and in treating these other oils, the oil, water and brine mixture is maintained thruout the process and apparatus at pressures sufficiently high to prevent evaporation or distillation at the temperatures employed.

Referring to the accompanying drawings:
Figure (1) is a diagrammatic plan view.
Figure (2) is a diagrammatic side view.

The petroleum oil is withdrawn from storage (1) thru a supply pipe into which water or steam is introduced in the desired quantity. Sufficient water is necessary to thoroughly emulsify the crude in order that the salts which may be held in suspension may be dissolved. The water and oil mixture is drawn thru the charging pump (3). From the charging pump (3), the mixture of oil and water passes thru a meter into a heater (5). The heater may be a pipe still, exchanger or any suitable means of bringing the mixture of oil and water up to the desired temperature. Prior to, or subsequent to, the heating stage, it may be found advisable to mix with the oil a chemical demulsifying agent, such as a sulphonated fatty acid, or the like, added from a source of supply designated as (4).

In our method of operation, approximately 7% water, including the natural water in the oil or sufficient steam condensed to make 7% water, is mixed with the oil and the oil-water mixture is then pumped thru the heater (5) where the mixture is brought to a suitable temperature which for one particular petroleum oil was 300° F. Investigation of petroleum oils which contain high percentages of wax, asphalt and similar material show that the crystals of salts and small droplets of water are surrounded by an asphalt, wax or a film of similar material. Heating the oil to a suitable temperature breaks these films and allows the water to dissolve the crystals of salts. From the heater, the oil passes thru a filter (6) which comprises a layer of granular material of such mesh as to allow the oil to pass thru freely, thus breaking the emulsion which has been formed by causing the particles of water to gather into larger droplets. Sand has been found to be a satisfactory granular material. In case the filter should become plugged with sediment from the petroleum oil, it may be cleaned by back washing as shown in the diagrammatic plan view shown in Figure 1. It is desirable to have two filters (6) so that the process is continuous and one may be cleaned while the other is in use. From the filter, the oil goes to the settlers (7), which may consist of a series of insulated tanks connected with a pressure equalizing line. The mixture of oil and water is held at sufficient pressure to keep the petroleum oil and water in the liquid state thruout the entire apparatus and process system. The brine which consists of those naturally present in the petroleum oil, together with the dispersed crystals of salts dissolved in the water added, settles and is drawn off at the bottom of the settling tanks. From the settling tanks, the petroleum oil goes thru an intermediate storage or surge tank (8), then into the stills (10), by means of charging pumps (9). Steam or any suitable means of holding the temperature may be used to maintain the temperature in the settling drums (7).

During an actual commercial operation embodying the use of the process and apparatus described in the foregoing, upwards of 300,000 barrels of a certain type of petroleum oil, containing from 150 to 1,400 grams of salt per barrel, was treated and resulted in a reduction of the salt content of the treated oil to from 20 to 50 grams per barrel, thereby making much less expensive and troublesome the subsequent refining of the petroleum oil so treated. The foregoing is the preferred method of operation.

Modified method of operation in which the filter of granular material is not used involves the introduction of a chemical demulsifying agent. In this method of operation, the petroleum oil is mixed with approximately 7% water including the water already present in the petroleum oil, after which a suitable chemical demulsifying agent is added and the mixture heated to 300° F. or other suitable temperatures thru heater (5). From heater (5), the mixture of oil, water and chemical demulsifying agent goes to the settling tanks (7) where the brine which consists of those naturally present in the petroleum oil together with the dispersed crystals of salts dissolved in the water added is drawn off. Then the petroleum oil goes to the intermediate storage or surge tank (8), then into the stills (10). The chemical demulsifying agent may be added before or after the oil and water have gone thru the heater. In this method, the mixture of oil and water is also held at sufficient pressure to keep the oil and water in the liquid state throughout the entire apparatus and process system.

Other methods and modifications of the above methods embodying the inventions and discoveries disclosed herein will suggest themselves to those skilled in the art and we do not limit ourselves to the exact form of the two methods described herein.

We claim as our invention:
1. A process for the removal of water soluble mineral compounds from petroleum oil including the steps of adding water to the salt-containing petroleum oil, thereafter heating the mixture thus formed with sufficient incidental agitation to dissolve the salt in the added water, said heating being to a temperature below the boiling point of such mixture, but sufficiently high to rupture the asphaltic films surrounding the salt whereby the added water is enabled to dissolve the same, filtering the mixture and separating the brine from the oil by settling.

2. A process for the removal of water soluble mineral compounds from petroleum oil including the steps of adding water to the salt-containing petroleum oil, thereafter heating the mixture thus formed with sufficient incidental agitation to dissolve the salt in the added water, said heating being to a temperature below the boiling point of such mixture, but sufficiently high to rupture the asphaltic films surrounding the salt whereby the added water is enabled to dissolve the same, filtering the mixture and separating the brine from the oil by settling, the entire process being carried out under pressure sufficiently high to prevent substantial evaporation.

3. A process for the removal of water soluble inorganic mineral compounds from petroleum oil comprising the steps of adding water to the salt-containing petroleum oil, thereafter heating the mixture of water and oil with sufficient incidental agitation to rupture the asphaltic films surrounding the salt and to a temperature below the boiling point of such mixture, whereby the salt crystals contained in the petroleum oil will be dissolved in the added water, passing the heated mixture through a filter bed of granular material and separating the brine and oil by settling.

LLOYD L. DAVIS.
ALFRED HENRIKSEN.
JOHN J. ALLINSON.